United States Patent

Franzi

[15] 3,635,241
[45] Jan. 18, 1972

[54] PRESSURE REDUCER, PARTICULARLY FOR HYDRAULIC BRAKE SYSTEM IN VEHICLES

[72] Inventor: Riccardo Franzi, Turin, Italy
[73] Assignee: FIAT Societa per Azioni, Turin, Italy
[22] Filed: July 14, 1969
[21] Appl. No.: 841,525

[30] Foreign Application Priority Data

Apr. 1, 1969 Italy ........................................ 841315

[52] U.S. Cl. .................................... 137/505.18, 137/505.38
[51] Int. Cl. ............................................................ F16k 17/02
[58] Field of Search ................ 303/6 C, 22; 137/517, 505.38, 137/505.18, 543.19

[56] References Cited

UNITED STATES PATENTS

| | | | |
|---|---|---|---|
| 3,095,897 | 7/1963 | Pennstrom | 137/505.18 |
| 3,395,729 | 8/1968 | Temple | 137/543.19 |
| 3,191,999 | 6/1965 | Cordiano | 303/22 |

FOREIGN PATENTS OR APPLICATIONS

| | | | |
|---|---|---|---|
| 1,274,049 | 11/1960 | France | 303/6 C |
| 1,503,374 | 12/1966 | France | 303/6 C |

*Primary Examiner*—Herbert F. Ross
*Assistant Examiner*—William H. Wright
*Attorney*—Sughrue, Rothwell, Mion, Zinn & Macpeak

[57] ABSTRACT

This invention relates to a pressure reducer of the type having a piston slidable in a cylinder with a piston head in the cylinder cooperating with a resilient packing to subdivide the cylinder into high- and low-pressure chambers. A spring is provided in the high-pressure chamber surrounding the piston rod, and engages at one end a piston rod packing and at the other end a radial projection on the piston rod. The radial projection is spaced axially from the piston head by a distance which is greater than the axial length of the piston head packing, the spring preferably holding the piston at the low-pressure end of the cylinder even in the absence of external spring loading on the piston rod.

1 Claims, 5 Drawing Figures

PRESSURE REDUCER, PARTICULARLY FOR HYDRAULIC BRAKE SYSTEM IN VEHICLES

This invention relates to pressure reducers, particularly for hydraulic brake systems in motor vehicles.

More particularly, the invention relates to pressure reducers of the type comprising a piston mounted for sliding movement in a cylinder and having a piston rod of a diameter substantially smaller than the bore of the cylinder and projecting from the cylinder through an opening in one end wall thereof, said piston having a head of a greater diameter than the rod and subdividing the interior of the cylinder into a high-pressure chamber, defined between the cylinder wall and the piston rod and connectable to a master cylinder, and a low-pressure chamber connectable to a braking circuit, a resilient packing cooperating with the piston head and disposed in the high-pressure chamber, and a reaction spring accommodated in the high-pressure chamber and biassing the piston towards one end of its stroke in the direction of the low-pressure chamber. Such pressure reducers are referred to as being of "the type herein defined."

A stop may be provided within the cylinder for limiting movement of the piston head packing towards the low-pressure end of the cylinder so as to keep communication open between the low- and high-pressure chambers when the piston is at said low-pressure end of its stroke.

Variants of such pressure reducers are also known in which the high-pressure chamber contains only a weak spring the function of which is simply to hold in position an annular piston rod packing which provides a seal at the passage of the piston rod through the respective end wall of the cylinder, and at the same time to resist movement of the resilient packing cooperating with the piston head towards the direction of the high-pressure chamber. An external reaction spring is situated outside the cylinder of such a known pressure reducer and acts on one arm of a rocking lever articulated on the body of the reducer, the other arm of said lever transmitting the thrust of the spring to the end of the piston rod which projects from said cylinder to hold the piston at the said low-pressure end of its stroke.

Experiments have shown that pressure reducers of this latter-type suffer from the disadvantage that a certain play may develop between the end of the piston rod projecting from the cylinder and the surface facing that end of the rocking lever arm subjected to the action of the external reaction spring. This results in uncontrolled displacements of the piston inside the cylinder, giving rise to troublesome noise and to wear of the parts concerned, particularly of the piston head packing, and also giving rise to more serious functional disadvantages.

An object of the present invention is to obviate such disadvantages.

Accordingly the present invention provides a pressure reducer of the type herein defined, in which the spring in the low-pressure chamber serves to hold in position an annular piston rod packing which ensures fluid tightness of the passage of the piston rod through the opening in said one end wall of the cylinder, the spring bearing at its end opposite said piston rod packing against a radial projection formed on a portion of the piston rod near the piston head at a distance from the latter which is greater than the axial length of the piston head packing.

Preferably the said spring exerts a sufficient load to hold the piston in a position corresponding to said one end of its stroke in the direction of the low-pressure chamber, even in the absence of an external spring loading on the piston rod.

In an alternative embodiment of the invention, the head of the piston is surrounded by an annular spacer element spacing the piston head packing from the low-pressure end of the cylinder and having an axial length which is greater than that of the piston head.

In a modification of this embodiment, the annular spacer element is provided, on its surface facing in the direction of the high-pressure chamber, with an annular groove and the piston head is provided at its end remote from the piston rod with an annular radial flange having an external diameter which is smaller than the internal diameter of the annular groove in the spacer element, but which is greater than the diameter of the central bore of said annular spacer element.

The invention will be more clearly understood from the following description, given by way of example only, with reference to the accompanying drawings, in which.

In all the drawings, components corresponding to one another are denoted by the same reference numerals.

Figure 4:
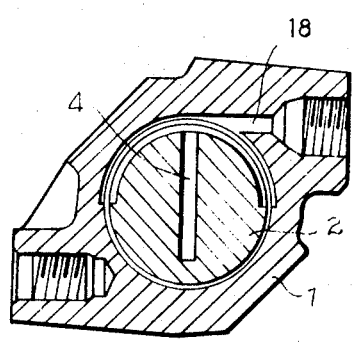

The pressure reducer illustrated in FIGS. 1 to 4 comprises a cylinder 1 closed at one end by a screw-threaded cover 2. The cover 2 is provided on its external end face with a pair of sockets 3 for receiving a torque-applying tool (not shown) which facilitates assembly and disassembly of the reducer. The cover 2 is provided on its internal face with a transverse channel 4 (FIG. 4).

Inside the cylinder 1 there is mounted a piston, the rod 5 of which is mounted for sliding movement in an opening 6 formed in the end wall 1a of the cylinder at the opposite end to the cover 2. The piston rod 5 is provided, at its end projecting out of the cylinder 1, with a curved end surface 5a, and at its opposite end, within the cylinder 1, the rod 5 carries a piston head 7. The surface of the piston head 7 facing in the direction of the cover 2 carries a central projection 7a, while the opposite face of the piston head 7 carries an annular peripheral lip 7b.

The head 7 is surrounded, with radial clearance, by an annular spacer element 8, the axial length of which is greater than the total axial length of the head 7 including the projection 7a. On the side of the annular spacer element 8 remote from the cover 2 there is provided the annular piston head packing 9 made of resilient material, for example rubber. The packing 9 is positioned with slight radial compression in the bore of the cylinder 1 and surrounds, with radial clearance, a reduced diameter part 5b of the piston rod 5 near the head 7.

Figure 1:
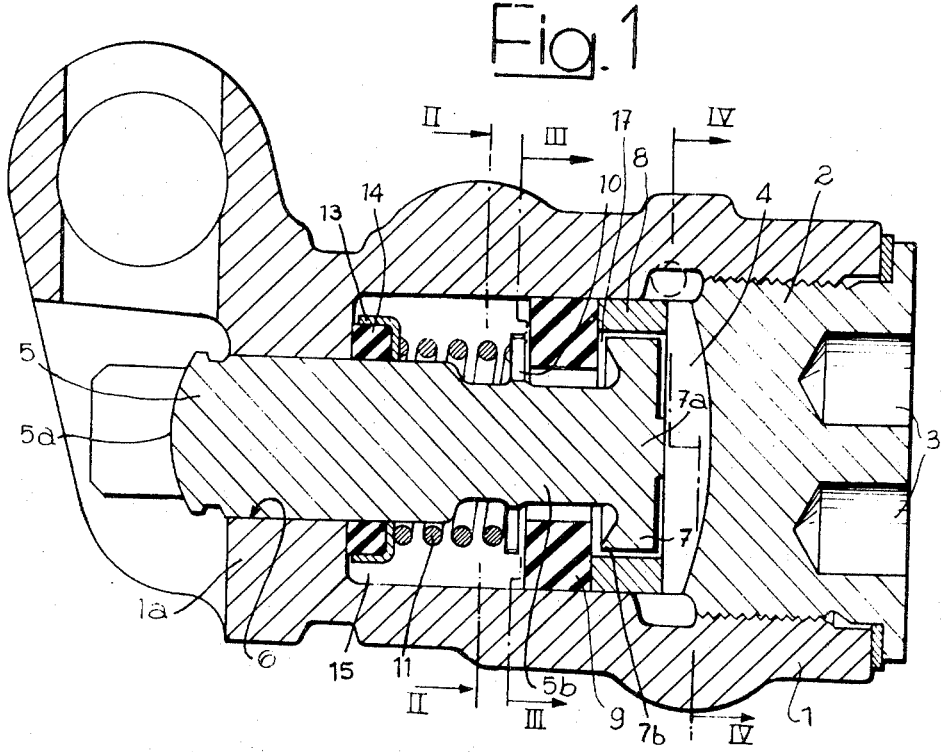
FIG. 1 is an axial section of a pressure reducer according to one embodiment of the invention.
Figure 2:
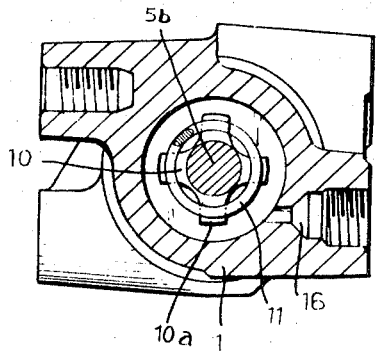
FIGS. 2, 3 and 4 are sections on a smaller scale through the lines II—II, III—III and IV—IV respectively in FIG. 1.
Figure 3:
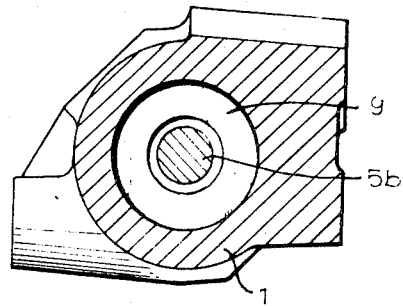

At a distance from the head 7 greater than the axial length of the piston head packing 9 the piston rod 5 is provided with a radial projection 10 comprising in this embodiment a plurality of (four in this instance) radially extending tongues 10a (FIG. 2). A helical compression spring 11 surrounds the piston rod 5 and bears at one end against the radial projection 10. The purpose of the spring 11 is to hold the head 7 always in contact with the cover 2, even when an external reaction spring (not illustrated in the present application but similar to the arrangement shown in U.S. Pat. No. 3,191,999) situated outside the pressure reducer does not exert a load on the end of the piston rod 5 projecting out of the cylinder. The spring 11 bears at its end opposite to that bearing on the projection 10 against a sheet metal cup 13 which holds a resilient annular piston rod packing 14 in position. The packing 14 ensures fluid tightness of the passage of the piston rod 5 through the opening 6 in the end wall 1a of the cylinder 1.

During displacement of the piston 5, 7 away from the cover 2, which takes place in known manner during the operation of the pressure reducer, the lip 7b of the head 7 engages a circular region of the packing 9. This results in a clear subdivision of the interior of the cylinder 1 into a low-pressure chamber 17 adjacent the cover 2 and a high-pressure chamber 15 surrounding the piston rod 5. In use of the pressure reducer the high-pressure chamber 15 is connected to a master cylinder (not shown) through a port 16 (FIG. 2) and the low-pressure chamber 17 is connected through a port 18 (FIG. 4) to a fluid pressure brake line leading to the rear wheel brake actuators (not shown) of a vehicle.

Figure 5:
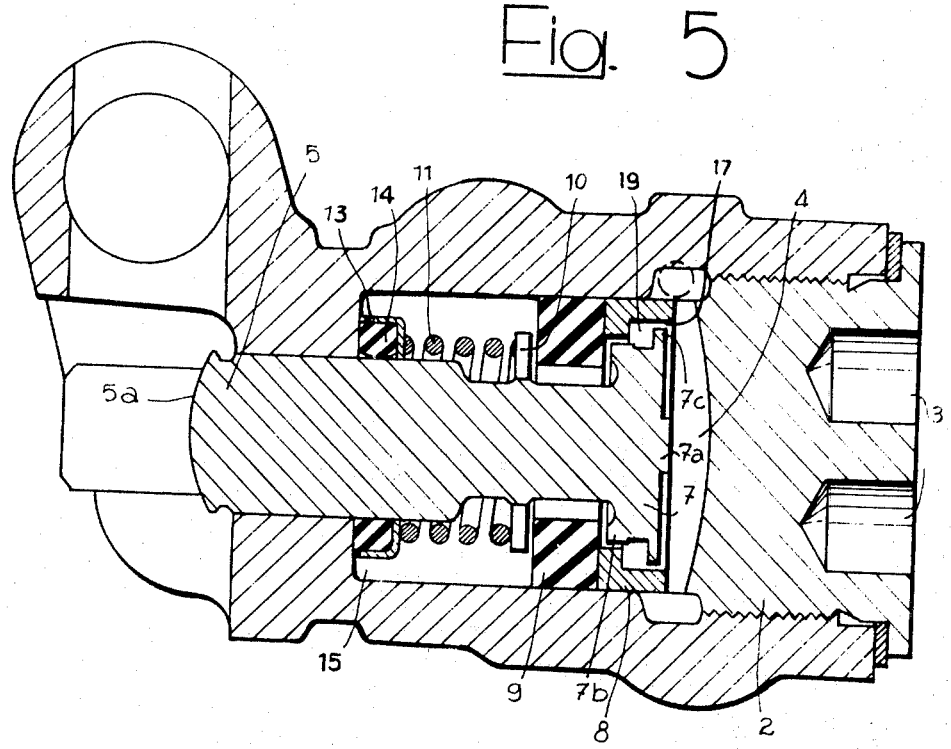
FIG. 5 is an axial section of a pressure reducer according to a modified embodiment of the invention.

In the modified embodiment illustrated in FIG. 5, the annular spacer element 8 is provided with a steplike annular groove 19 in its surface facing the cover 2. The piston head 7 is provided at its end nearest the cover 2 (i.e., remote from the piston stem 5) with an annular radial flange 7c the external diameter of which is slightly smaller than the internal diameter of the groove 19 but is greater than the diameter of the central bore of the annular spacer element 8. This arrangement serves to prevent, during assembly of the pressure reducer, the insertion into the cylinder 1, by error, of a piston the head 7 of which has dimensions different from those required to obtain a desired pressure reduction ratio.

It will be appreciated that constructional details of the embodiments of the invention herein described and illustrated by way of example can be varied without departing from the scope of the present invention as defined in the following claims.

I claim:

1. A pressure reducer for varying hydraulic pressure in a fluid pressure line comprising a hollow cylinder having end closure means disposed at one end thereof and an end wall at the opposite end thereof, piston means having an enlarged head at one end slidable mounted in said cylinder with said head disposed adjacent said closure means and having a piston rod projecting through said end wall for operative engagement with reaction spring means, fluid inlet and outlet means located in said cylinder in communication with opposite sides of said head respectively, piston rod packing means surrounding said piston rod contiguous to said end wall, a rigid cup member overlying said packing means, radially projecting means formed integrally with said piston rod and spaced from said head, said radially projecting means comprising a plurality of radially extending arms located in a common plane and spaced apart from each other to provide reduced resistance to fluid flow, spring means disposed between said rigid cup member and said radially extending arms for biasing said head into engagement with said closure means, an annular resilient-sealing ring disposed in engagement with said cylinder intermediate said projecting means and said head and having an axial length less than the distance between said radially extending arms and said head, and annular spacer means separate from said closure means disposed in contact with said cylinder surrounding said head and having an axial length greater than that of said head for spacing said sealing ring from said closure means, said spacer means being provided with an annular groove along the radially inward edge thereof adjacent said closure means, and said head being provided at its end adjacent said closure means with an annular radially extending flange having an external diameter which is smaller than the internal diameter of said annular groove but which is greater than the internal diameter of said spacer means to prevent erroneous assembly of the pressure reducer.

* * * * *

UNITED STATES PATENT OFFICE
CERTIFICATE OF CORRECTION

Patent No. 3,635,241          Dated January 18, 1972

Inventor(s) Riccardo Franzi

It is certified that error appears in the above-identified patent and that said Letters Patent are hereby corrected as shown below:

PAGE 1 (In the Heading)

Line 7, delete "Claims priority, application Italy, Apr. 1, 1969, 841345 and substitute therefor--Claims priority, application Italy July 12, 1968, No. 52422-A/68--.

Signed and sealed this 13th day of June 1972.

(SEAL)
Attest:

EDWARD M. FLETCHER, JR.           ROBERT GOTTSCHALK
Attesting Officer          Commissioner of Patents